United States Patent [19]
Guizot et al.

[11] Patent Number: 5,335,555
[45] Date of Patent: Aug. 9, 1994

[54] VOLUME FLOW METER THAT MEASURES TRANSIT TIME

[75] Inventors: Jean-Luc Guizot, Charentonle Pont; Bradley King, Malakoff; Alain Zarudiansky, Vélizy, all of France

[73] Assignee: Schlumberger Industries S.A., Montrouge, France

[21] Appl. No.: 141,977

[22] Filed: Oct. 28, 1993

[30] Foreign Application Priority Data

Nov. 10, 1992 [FR] France ............... 92 13651

[51] Int. Cl.$^5$ .................... G01F 1/708; G01F 1/68
[52] U.S. Cl. .................................... 73/861.95
[58] Field of Search .................. 73/861.05, 861.95

[56] References Cited

U.S. PATENT DOCUMENTS

| | | | |
|---|---|---|---|
| 2,776,565 | 1/1957 | Hudson | 73/861.95 |
| 4,228,683 | 10/1980 | Juffa et al. | 73/861.95 |
| 4,633,578 | 1/1987 | Aine et al. | 29/612 |
| 4,644,800 | 2/1987 | Kozlak | 73/861.32 |
| 4,713,970 | 12/1987 | Lambert | 73/861.95 |
| 5,243,858 | 9/1993 | Erskine et al. | 73/861.95 |

FOREIGN PATENT DOCUMENTS 0173461 3/1986 European Pat. Off. .
9210725 6/1992 PCT Int'l Appl. .

*Primary Examiner*—Richard E. Chilcot, Jr.
*Assistant Examiner*—William L. Oen
*Attorney, Agent, or Firm*—Sanford J. Asman

[57] ABSTRACT

An aerodynamic enclosure is placed in the flow, the enclosure including an opening enabling the enclosure to be filled with the flowing fluid, and having a thermal pulse generator mounted flush with its wall, which generator is suitable for emitting modulated thermal pulses simultaneously to the outside and to the inside of the enclosure. A first thermal sensor is located in the flow and a second thermal sensor is located in the enclosure. The sensors measure propagation times or phase shifts of the thermal waves respectively in the flow and in the non-flowing fluid, thereby making it possible to deduce the value of the fluid flow rate while compensating for any variations in the temperature, pressure, and composition of the fluid. The invention is applicable to gas metering.

15 Claims, 3 Drawing Sheets

VOLUME FLOW METER THAT MEASURES TRANSIT TIME

The present invention provides a fluid volume flow meter that measures transit time to provide an indication of volume flow rate, that is compensated for temperature and pressure, and that is independent of variations in the composition of the fluid whose flow rate is being measured. It is particularly suitable for metering fuel gas for domestic consumption.

BACKGROUND OF THE INVENTION

In general, in order to determine a flow rate from a measured transit time of a thermal pulse, a thermal pulse emitter such as a heater resistance element is placed in the flowing fluid. A temperature sensor, e.g. a thermocouple, is placed in the proximity of the thermal wave generating element.

The time taken by the thermal pulse to propagate from the emitter to the sensor is measured. This transit time depends on the flow speed of the fluid. When the shape of the flow duct is known, the flow rate can be deduced from the measured flow speed.

It is conventional practice for the thermal pulse to be modulated. Under such circumstances, it is a phase shift between the emitted thermal wave and the detected thermal wave that is, in fact, measured.

In this specification, measuring "transit time" is used generically to cover both measuring a phase shift between the emission and the detection of a thermal pulse and measuring a propagation time of that pulse.

That basic principle applies only in the ideal case where the temperature, the pressure, and the composition of the fluid are not subject to change. Should any of these parameters fluctuate, then the diffusion coefficient of the fluid varies, and for given flow speed, pulse propagation time varies. Flow rate measurement thus contains error. Unfortunately, these parameters vary considerably in the fuel gas normally delivered by suppliers. Thus, under such conditions, in order to be able to determine flow rate by using transit time measurement (propagation time or phase shift), it is necessary to correct the measured transit time to take account of variations in temperature, pressure, and composition of the gas. Knowledge of these parameters makes it possible to determine the diffusion coefficient of the gas, and consequently to deduce the speed of the fluid (and its flow rate) on the basis of a measured transit time.

It will be understood that such additional measurements make the determination of flow rate much more complicated and require devices that are difficult to implement and that are expensive both in money and in energy.

U.S. Pat. No. 4,713,970 discloses a device for measuring propagation time that is compensated in temperature and in pressure while avoiding taking direct measurement of temperature and pressure. A wire heating resistance is deposited on an insulating substrate and a thermo-electric detector is placed on the substrate to detect the thermal waves emitted by the heating resistance. The hot wire extends perpendicularly to the flow direction of the fluid, and the thermoelectric detector is placed in the fluid flow directly upstream or downstream from the hot wire so as to detect thermal waves that propagate parallel to the fluid flow. A reference device identical to the above device is used for compensating for the effects of pressure and temperature. For this purpose, the reference device is used to perform measurement at a zero flow rate.

In a first series of embodiments, the reference device is placed perpendicularly to the measurement device. Thermal wave propagation is then substantially perpendicular to the fluid flow direction and is thus practically independent of fluid flow speed. However that device is sensitive to disturbances in the flow.

In another embodiment, the reference device is placed in a region where the fluid is at rest.

Although the devices described in Document U.S. Pat. No. 4,713,970 do indeed provide improvements over the basic device, they nevertheless suffer from numerous drawbacks that prevent them from being used in an application to metering fuel gas.

The heater element is placed on the same wall of a substrate as the thermoelectric detector. Thermal pulse propagation measurements are performed locally in the vicinity of the wall and are therefore highly sensitive to variations of viscosity due to possible changes in the composition of the fluid. This measurement inaccuracy is inherent to the structure of the sensor and cannot be compensated without additionally determining the composition of the fluid. In addition, in the vicinity of the substrate wall, the dynamic speed of the fluid is reduced relative to the dynamic speed at some distance from said wall. It is known that flow speed is substantially zero along a wall whatever the speed profile may be elsewhere. This therefore results in the sensitivity of the system being reduced. Furthermore, since the substrate is not a perfect insulator, thermal leaks exist between the thermal emitter and the thermal sensor. Such thermal leaks necessarily increase the amount of energy that needs to be provided to ensure that the system operates properly. Variations in pressure and temperature are compensated in U.S. Pat. No. 4,713,970 by doubling up the measurement structure. As a result, the devices described therein require at least two heater elements.

It will thus be understood that the energy required to operate such compensated devices is at lease twice the energy that is required for a device having a single heater element. Unlike the field of measuring the air flow in automotive engines induction, which is the field addressed by the devices of the document U.S. Pat. No. 4,713,970, questions of energy consumption are of great importance in the field of obtaining a volume flow meter suitable for metering fuel gas. It is then necessary for an electrical battery to be capable of providing sufficient energy to guarantee a lifetime of at least ten years without there being any need to change the battery. This constraint makes it impossible to adapt one of the devices described in document U.S. Pat. No. 4,713,970 to a gas metering application.

OBJECTS AND SUMMARY OF THE INVENTION

The present invention mitigates the above drawbacks. It enables a volume flow rate to be measured in spite of fluctuations in the temperature, pressure, or composition of the gas.

In addition, the device of the invention requires one heater element only, thereby enabling its energy consumption to be reduced.

More precisely, the present invention provides a volume flow meter that measures transit time and that is suitable for being placed in a duct having a fluid flowing therealong. The flow meter comprises:

an enclosure provided with an opening suitable for enabling fluid exchange to take place between the inside and the outside of the enclosure, the fluid inside the enclosure being substantially at rest;

a single heater element mounted flush with the wall of the enclosure and suitable for emitting modulated thermal pulses simultaneously to the inside and to the outside of the enclosure;

a first thermal sensor placed outside the enclosure without making contact with the enclosure and in the proximity of the heater element;

a second thermal sensor placed inside the enclosure without making contact with the enclosure and in the proximity of the heater element;

measurement means for measuring a first transit time between the emission of thermal pulses and the detection thereof by the first thermal sensor, and a second transit time between the emission of thermal pulses and the detection thereof by the second thermal sensor; and means responsive to the first and second transit times for deducing a volume flow rate that is compensated in temperature and pressure and that is independent of the composition of the fluid.

The device of the invention thus performs a first transit time measurement in the fluid that is flowing and a second transit time measurement in the fluid at rest. The second measurement is used to determine the diffusion coefficient of the fluid so as to enable the first measurement to be corrected over the entire dynamic range of measurement.

It is recalled that a "transit time" measurement may comprise either a phase shift measurement or a propagation time measurement.

The thermal sensors are offset from the wall on which the heater element is placed, thereby making it possible to reduce the effects of viscosity. The energy required for creating and propagating the thermal wave is less than that required in prior art devices. Energy consumption is also minimized by using a single heater element instead of two as in the prior art.

Advantageously, the heater element is constituted by a heater resistance element disposed on one of the faces of a membrane suitable for enhancing heat conduction through the thickness of the membrane to the detriment of lateral heat conduction.

In a particular embodiment, the heater element comprises:

a support pierced by an orifice;

an electrically insulating layer secured to the support and forming a membrane over the orifice;

a heater resistance element constituted by a conductive deposit formed on the membrane; and contact tracks connected to the ends of the heater resistance element.

Advantageously, the layer is made of silicon nitride. The layer can also be made of polymer. In another particular embodiment, the volume flow meter of the invention includes at least one temperature sensor fixed to the heater element.

In an advantageous embodiment, at least a portion of the enclosure co-operates with a wall of the channel to form at least one converging channel, and the first thermal sensor is placed in said channel. This converging channel within which the first measurement is performed serves to increase the local speed of the fluid and thus to improve the signal/noise ratio of the device.

In a particular embodiment of the invention, the enclosure constitutes an aerodynamic obstacle for the flow of fluid. This obstacle may be placed in a midplane of the duct. The aerodynamic obstacle may have an upstream portion that is substantially elliptical and a downstream portion that tapers, with the upstream portion co-operating with the wall of the duct to form at least one converging channel. It is also possible for the downstream portion to co-operate with the wall of the duct to form at least one converging channel. The obstacle serves to minimize the effect of changes in the viscosity of the fluid.

Advantageously, the heater element is placed on the side of the obstacle in the upstream portion thereof cooperating with the wall of the duct to form at least one converging channel.

Advantageously, the opening is placed in the downstream portion of the enclosure, thereby avoiding disturbance to the flow of fluid over the measuring elements (heater element, temperature sensors) placed inside the cavity.

Preferably, the first temperature sensor is placed upstream from the heater element.

BRIEF DESCRIPTION OF THE DRAWINGS

The invention and the advantages thereof will be better understood on reading the following description given by way of non-limiting illustration and made with reference to the accompanying drawings, in which.

MORE DETAILED DESCRIPTION

Figure 1:
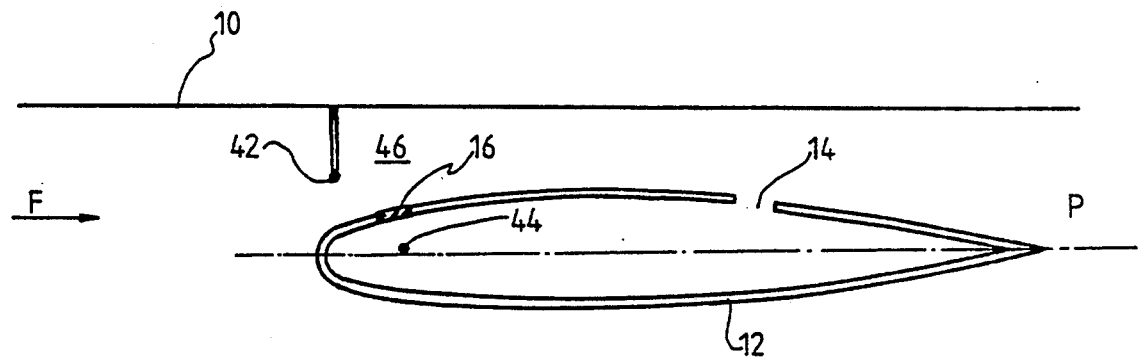
FIG. 1 is a diagrammatic plan section view of a device of the invention.

An embodiment of a device in accordance with the invention is now described with reference to FIGS. 1 and 2. The fluid F whose volume flow rate is to be measured is a gas, for example, and it flows along a duct 10, e.g. of square section. The duct 10 has a midplane P. An obstacle 12 that forms an enclosure is disposed in the duct 10. This obstacle is aerodynamic in shape. In the example shown, the obstacle has an elliptical upstream portion and a tapering downstream portion. The long axis of the ellipse lies in the midplane P. As can be seen in FIG. 2, the obstacle 12 extends over the full height of the duct. The obstacle 12 may be made of aluminum or of plastics material, for example. In the downstream portion of one of its flanks, the enclosure 12 has an opening 14 allowing fluid to be interchanged between the inside and the outside of the enclosure 12.

On the upstream portion of one of its flanks, the enclosure 12 carries a heater element 16 that is mounted flush with the outside wall of the enclosure. The heater element 16 is mounted in an opening in the enclosure that is provided for this purpose. The heater element 16 is suitable for emitting thermal waves simultaneously to the inside and to the outside of the enclosure 12.

Advantageously, the heater element 16 is constituted by a heater resistance element formed on a membrane. An example of such an element is shown diagrammatically in plan view in FIG. 3A and in section in FIG. 3B.

Figure 3A:
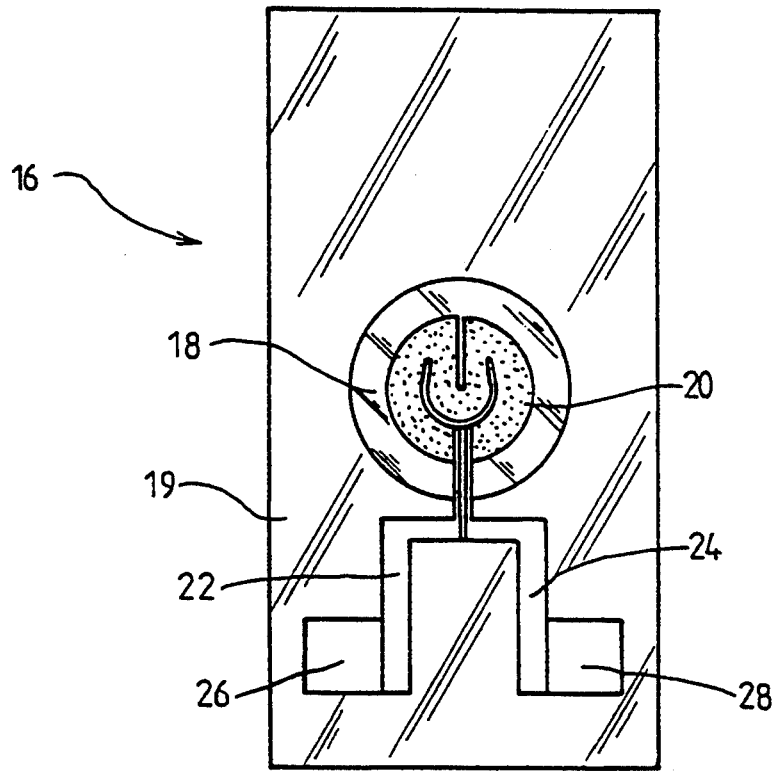
FIGS. 3A and 3B are a diagrammatic plan view and section view respectively of a heater element.
Figure 3B:
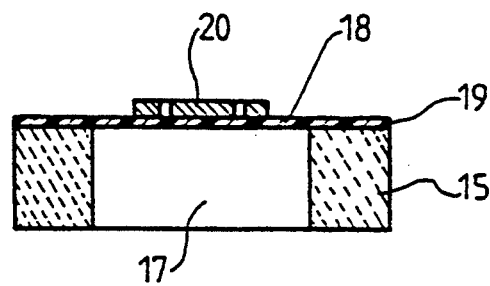

As can be seen in FIGS. 3A and 3B, the heater element 16 comprises a support 15 pierced by an orifice 17.

The diameter of the orifice may be 3 mm, for example. An electrically insulating layer 19, e.g. of silicon nitride is deposited on the support 15 so as to form a membrane 18 that is tensioned over the orifice 17. The layer 19 can also be made of a polymer material such as "Kapton" for example. The thickness of the layer 19 is such that the membrane is suitable for minimizing heat losses through the support. In other words, the thickness of the membrane is chosen so as to enhance transverse heat conduction to the detriment of lateral heat conduction. The thickness may be a few microns. A heater resistance element 20 is formed on the membrane 18. It may be obtained by metallic deposition of NiCr, for example. The shape of the resistance element 20 as shown in FIG. 3 ensures that each thermal pulse is emitted isotropically. Other shapes could naturally be adopted, e.g. a sinuous coil shape.

Conductor tracks 22 and 24 (made of gold for example) are connected to the ends of the resistance element 20 and are terminated by contact tabs 26 and 28 (e.g. made of gold) suitable for connection to a power supply circuit (not shown in FIGS. 3A and 3B).

Returning to FIGS. 1 and 2, it can be seen that the membrane 18 is mounted flush with the wall of the enclosure 12. The heater element 16 completely closes the opening in which it is fixed. This makes it possible to avoid the flow of fluid being disturbed as it passes over the heater element, and it also makes it possible to obtain fluid inside the enclosure in the vicinity of the heater element that is substantially at rest. The distance between the opening 14 placed downstream and the heater element 16 placed upstream on the same flank of the enclosure 12 also contributes to ensuring that the fluid inside the enclosure and near the heater element is substantially at rest. The face of the membrane 18 that supports the heater resistance element 20 has, for example, its face on the outside of the enclosure 12.

When a thermal wave is emitted by the heater element 16, it presents a specific phase shift to said heater element. This phase shift is dependant on the chemical composition of the fluid, given that the heater element 16 has a small thermal mass. Consequently, it is important to provide a temperature sensor on the heater element in order to measure the phase shift and therefore improve the quality of the flow rate measurements. This temperature sensor (which is not shown) is constituted, for example, by an electrical resistance in a circular form deposited on the membrane 18 of the heater element 16.

FIG. 2 shows that the heater element 16 is connected to a generator 40 of modulated electrical pulses. These pulses are emitted at a frequency that is lower than the cutoff frequency (for emitting thermal pulses) of the heater element. These pulses may be emitted at a frequency lying in the range 0.5 Hz to 2 Hz, and they may be of a duration lying in the range 0.1 seconds to 2 seconds. They may be modulated at a frequency lying in the range 1 Hz to 10 Hz. When an electrical current flows through the heater resistance element, the element emits a thermal wave isotropically. On the outside of the enclosure 12, the thermal wave propagates through the flowing fluid. On the inside of the enclosure 12, the thermal wave propagates through the membrane 18 and then through the fluid at rest. The time representative of the thermal wave propagating through the membrane is negligible compared with the time characteristics of the thermal wave propagating through the fluid.

The thermal waves emitted to the inside and to the outside of the enclosure 12 are detected by thermal sensors 42 and 44 situated close to the heater element 16, but away from the wall of the enclosure and without contacting either the outside or the inside of the enclosure 12. These thermal sensors 42 and 44 may be thermocouples that are disposed at no more than a few millimeters from the heater element 16. For example they may be one millimeter away therefrom. The thermocouples used may be copper-constantan thermocouples.

FIG. 2 shows that the inside thermocouple 44 is fixed to the top wall of the duct 10. The outside thermocouple 42 is fixed to the side wall of the duct 10 that faces the side of the enclosure 12 which supports the heater element 16. The thermocouple 42 is disposed upstream from the heater element 16. It has been observed that this disposition makes it possible to achieve the desired dynamic range of measurement and to detect very low flow rates.

Figure 2:
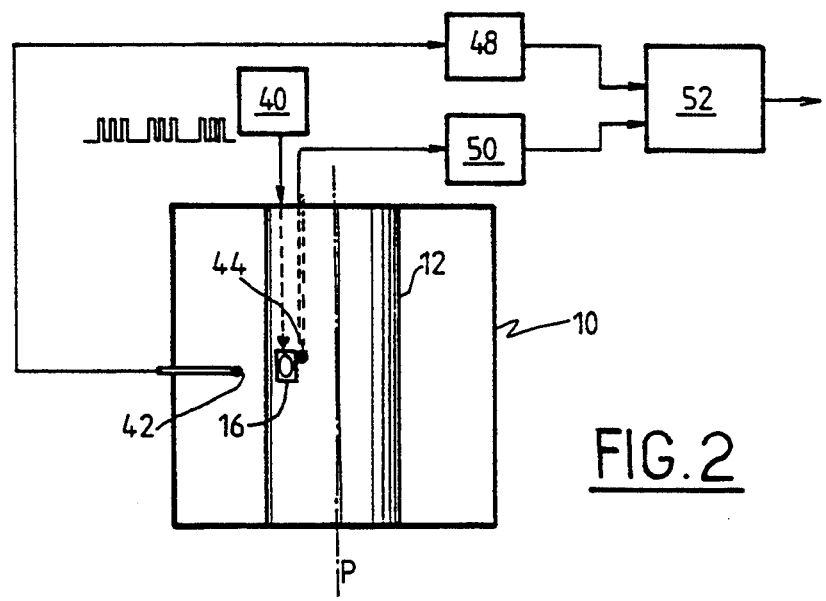
FIG. 2 is a diagrammatic end view of a device of the invention.

In addition, FIG. 1 shows that the outside thermocouple 42 is placed in a converging channel 46 formed by the upstream side of the enclosure 16 and the wall of the duct 10.

This converging shape serves to improve the appearance of the speed profile in the vicinity of the measuring elements. This serves to improve the signal/noise ratio of the measurement.

Figure 4:
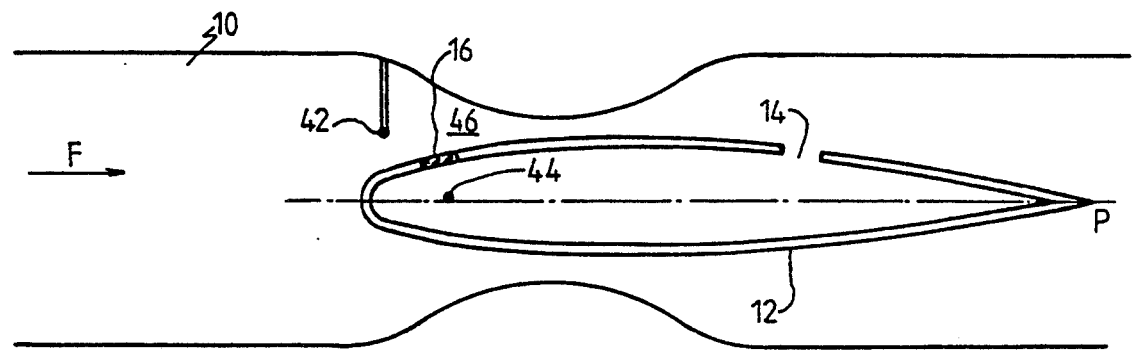
FIG. 4 is a diagrammatic plan view of a variant embodiment of a device of the invention.

FIG. 4 is a diagrammatic plan view of a variant embodiment in which the side walls of the duct 10 form a constriction over the enclosure 12. Thus, the channel 46 converges to a greater extent so the increase in speed is greater as is the improvement of the speed profile.

With reference again to FIG. 2, the means implemented for measuring volume flow rate are now described. Under the effect of modulated electrical pulses delivered by the generator 40, the heater element 16 generates modulated pulsed thermal waves that propagate almost simultaneously through the fluid moving along the channel 46 (FIG. 1) and through the inside of the enclosure 12. These thermal waves are detected by the thermal sensors 42 and 44 on the outside and on the inside of the enclosure 12.

Each thermal sensor 42, 44 is connected to a synchronous detection system 48, 50 operating at the frequency with which the thermal pulses are modulated. These synchronous detection systems deliver respective output signals corresponding to a phase shift, one of which (from the system 48) corresponds to the phase shift due to the thermal wave propagating through the flowing fluid, while the other one (from the system 50) corresponds to the phase shift due to the thermal wave propagating through the fluid at rest inside the enclosure 12. Thus, the first phase shift is a function of the characteristics of the fluid (via the intermediary of its diffusion coefficient), and of its speed, whereas the second phase shift is a function only of the characteristics of the fluid.

These synchronous detectors have their outputs connected to a computer system 52 such as a suitably programmed processor which delivers an output signal representative of the fluid flow rate as calculated on the basis of the measured phase shift. The device is calibrated prior to measurement being performed.

The phase shift measured at zero flow rate can be used to correct the flow rate measurement as a function of variations in the temperature, the pressure, and the composition of the fluid. This measurement is equivalent to evaluating the diffusion coefficient of the fluid that is flowing.

The person skilled in the art can also measure directly the respective propogation times of a thermal pulse from the heater element 16 to the first and second thermal sensors 42, 44. In such a case, instead of using the generator 40 to generate a plurality of pulses, the generator is used to generate only one pulse.

In conventional manner, a clock operating at quite a high frequency is used to obtain good measurement accuracy, and a threshold detector is used for measuring the propagation time of the thermal pulse. It is also possible to use the well-known sing-around technique.

Figure 5:
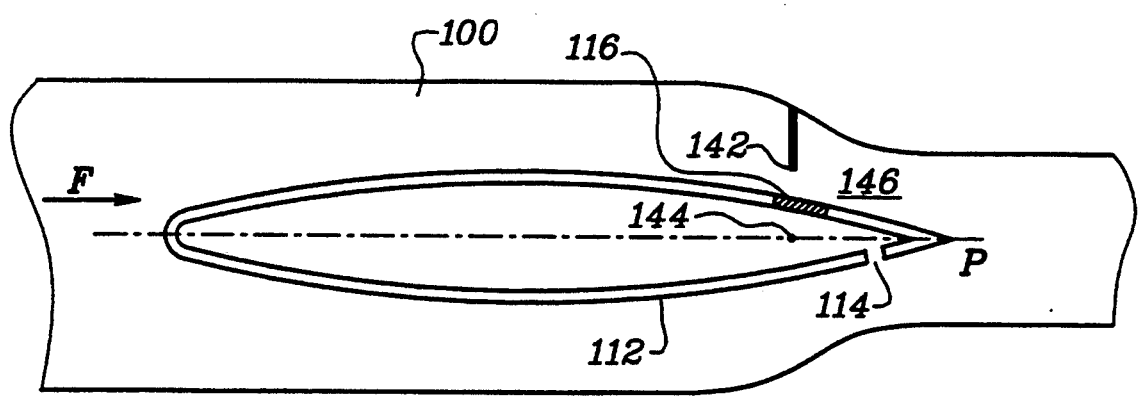
FIG. 5 is a diagrammatic plan view of another embodiment of a device of the invention.

Another embodiment of the invention is shown in FIG. 5. The description below does not repeat everything described above for the first embodiment, and in particular it does not describe the principle used for measuring fluid flow; only features differing from those described above, together with the advantages thereof, are described below.

As shown in FIG. 5, the aerodynamic obstacle 112 has a tapering downstream portion that co-operates with the side walls of the duct 110 to form at least one converging channel 146. A heater element 116 is mounted flush with the outside wall of the enclosure 112 on a downstream portion of one of the sides of the enclosure 112. This characteristic has the advantage of protecting the heater element against possible pollution.

The first thermal sensor 142 is situated upstream from the heater element 116, outside the enclosure 112 but not in contact therewith, while the second thermal sensor 144 is placed inside said enclosure. The first thermal sensor 142 could alternatively be situated downstream of the heater element 116.

To avoid disrupting the flow measurements, the opening 114 enabling fluid exchange to take place between the inside and the outside of the enclosure 112 is formed in the side of the enclosure opposite to its side carrying the heater element 116 and it is formed in the downstream portion of said enclosure 112.

The fact that the downstream portion of the obstacle co-operates with a wall of the duct to form at least one converging channel has the effect of conserving a laminar speed profile, thus enabling accurate measurements to be obtained over a wide range of flow rates.

We claim:

1. A volume flow meter that measures transit time and that is suitable for being placed in a duct having a fluid flowing therealong, the flow meter comprising:
   an enclosure provided with an opening suitable for enabling fluid exchange to take place between the inside and the outside of the enclosure, the fluid inside the enclosure being substantially at rest;
   a single heater element mounted flush with the wall of the enclosure and suitable for emitting modulated thermal pulses simultaneously to the inside and to the outside of the enclosure;
   a first thermal sensor placed outside the enclosure without making contact with the enclosure and in the proximity of the heater element;
   a second thermal sensor placed inside the enclosure without making contact with the enclosure and in the proximity of the heater element;
   measurement means for measuring a first transit time between the emission of thermal pulses and the detection thereof by the first thermal sensor, and a second transit time between the emission of thermal pulses and the detection thereof by the second thermal sensor; and
   means responsive to the first and second transit times for deducing a volume flow rate that is compensated in temperature and pressure and that is independent of the composition of the fluid.

2. A volume flow meter according to claim 1, wherein the heater element is constituted by a heater resistance element disposed on one of the faces of a membrane suitable for enhancing heat conduction through the thickness of the membrane to the detriment of lateral heat conduction.

3. A volume flow meter according to claim 2, wherein the heater element comprises:
   a support pierced by an orifice;
   an electrically insulating layer secured to the support and forming a membrane at the orifice;
   a heater resistance element constituted by a conductive deposit formed on the membrane; and
   conductor tracks terminated by contact tabs and connected to the ends of the heater resistance element.

4. A volume flow meter according to claim 3, wherein the layer is made of polymer.

5. A volume flow meter according to claim 3, wherein the layer is made of silicon nitride.

6. A volume flow meter according to claim 1, comprising at least one temperature sensor fixed to the heater element.

7. A volume flow meter according to claim 1, wherein at least a portion of the enclosure co-operates with a wall of the channel to form at least one converging channel, and wherein the first thermal sensor is placed in said channel.

8. A volume flow meter according to claim 7, wherein the enclosure constitutes an aerodynamic obstacle for the flow of fluid.

9. A volume flow meter according to claim 8, wherein the enclosure is placed in a midplane of the duct.

10. A volume flow meter according to claim 8, wherein the enclosure has an upstream portion that is substantially elliptical and a downstream portion that tapers.

11. A volume flow meter according to claim 10, wherein the upstream portion co-operates with the wall of the duct to form at least one converging channel.

12. A volume flow meter according to claim 10, wherein the downstream portion co-operates with the wall of the duct to form at least one converging channel.

13. A volume flow meter according to claim 11, wherein the heater element is placed on the side of the enclosure where it co-operates with the wall of the duct to form at least one converging channel.

14. A volume flow meter according to claim 10, wherein the opening is placed in the downstream portion.

15. A volume flow meter according to claim 1, wherein the first thermal sensor is placed upstream from the heater element.

* * * * *